US010151578B2

(12) United States Patent
Motowaki

(10) Patent No.: US 10,151,578 B2
(45) Date of Patent: Dec. 11, 2018

(54) THICKNESS MEASUREMENT DEVICE AND THICKNESS MEASUREMENT METHOD

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 84 days.

(21) Appl. No.: 15/487,797

(22) Filed: Apr. 14, 2017

(65) Prior Publication Data

US 2017/0307358 A1 Oct. 26, 2017

(30) Foreign Application Priority Data

Apr. 21, 2016 (JP) .................. 2016-085226

(51) Int. Cl.
*G06F 19/00* (2018.01)
*G01B 11/02* (2006.01)

(52) U.S. Cl.
CPC .................. *G01B 11/026* (2013.01)

(58) Field of Classification Search
CPC ........... F16B 2/18; F16B 2/185; F16C 19/166
USPC ........................... 702/172, 182–185
See application file for complete search history.

(56) References Cited

U.S. PATENT DOCUMENTS 5,075,559 A 12/1991 Amir
2013/0074765 A1* 3/2013 Heylen .................... B41J 3/407
118/323

FOREIGN PATENT DOCUMENTS

| JP | H04319614 | 11/1992 |
| JP | H05309590 | 11/1993 |
| JP | H07146711 | 6/1995 |
| JP | 2000356510 | 12/2000 |
| JP | 2003247810 | 9/2003 |
| JP | 2009133745 | 6/2009 |

OTHER PUBLICATIONS

Japanese Office Action dated May 1, 2018, for Japanese Patent Application No. 2016-085226.

* cited by examiner

*Primary Examiner* — Edward Raymond
(74) *Attorney, Agent, or Firm* — Karceski IP Law, PLLC

(57) ABSTRACT

A thickness measurement device includes a chassis provided with an installation surface on which a measurement object is installed and a facing surface disposed parallel to the installation surface with a gap therebetween. A distance measurement instrument measures the distances to objects in two opposite directions. A movement mechanism positions the distance measurement instrument at a measurement point between the installation surface and the facing surface such that the measurement directions thereof are aligned with the direction along the gap between the installation surface and the facing surface. An arithmetic unit calculates the difference between the total of the distances measured at the measurement point in a state in which the measurement object is not installed on the installation surface and the total of the distances measured in a state in which the measurement object is installed on the installation surface.

7 Claims, 5 Drawing Sheets

THICKNESS MEASUREMENT DEVICE AND THICKNESS MEASUREMENT METHOD

CROSS-REFERENCE TO RELATED APPLICATIONS

This application is based on and claims priority to Japanese Patent Application No. 2016-085226, filed on Apr. 21, 2016, the entire contents of which are incorporated herein by reference.

FIELD OF THE INVENTION

The present invention relates to a thickness measurement device and a thickness measurement method.

BACKGROUND OF THE INVENTION

Height measuring devices for measuring the heights of articles with high precision by using a light source and a camera have been conventionally known (for example, see Japanese Unexamined Patent Application, Publication No. 2000-356510).

When there are a plurality of height measurement points at separate positions in the horizontal direction, and the heights at the measurement points are to be measured with high precision, it is necessary to provide the same number of measurement instruments as the number of measurement points or to move, by using a highly-precise movement device, a measurement instrument to the measurement points for measurement.

SUMMARY OF THE INVENTION

An object of the present invention is to provide a thickness measurement device and a thickness measurement method capable of measuring the thickness of a measurement object with high precision irrespective of the operating precision of a movement device.

According to one aspect, the present invention provides a thickness measurement device including: a chassis that is provided with an installation surface on which a measurement object is installed and a facing surface that is disposed substantially parallel to the installation surface with a gap therebetween; a distance measurement instrument that can measure the distances to objects in two opposite directions; a movement mechanism that disposes the distance measurement instrument at a measurement point between the installation surface and the facing surface such that the measurement directions thereof are aligned with the direction along the gap between the installation surface and the facing surface; and an arithmetic unit that calculates the difference between the total of distances in the two directions that are measured at the measurement point by the distance measurement instrument in a state in which the measurement object is not installed on the installation surface and the total of distances in the two directions that are measured by the distance measurement instrument in a state in which the measurement object is installed on the installation surface.

Specifically, because the distance measurement instrument measures the distances to objects in two opposite directions, the total of the distances does not change even when the distance measurement instrument is disposed at any position in the direction along the gap between the installation surface and the facing surface. Therefore, even when the distance measurement instrument is disposed at any position in the direction along the gap between the installation surface and the facing surface, in a state in which the measurement object is not installed, the total of distances measured by the distance measurement instrument serves as information indicating the distance between the installation surface and the facing surface, and, in a state in which the measurement object is installed, the total of distances measured by the distance measurement instrument serves as information indicating the distance between the measurement object and the facing surface. As a result, the difference between the two totals is calculated, thereby making it possible to calculate the thickness dimension of the measurement object with precision even when the operating precision of the movement mechanism is low.

In the above-described aspect, it is preferred that the measurement precision of the distance measurement instrument be higher than the operating precision of the movement mechanism.

In the above-described aspect, a plurality of the measurement objects may be installed on the installation surface.

In the above-described aspect, the measurement object may have a known thickness dimension and may be installed on the installation surface with an adhesive agent applied therebetween; and the arithmetic unit may subtract the thickness dimension of the measurement object from the calculated difference.

In the above-described aspect, the movement mechanism may be an articulated robot in which the distance measurement instrument is attached to a wrist end.

In the above-described aspect, it is possible to further include a hand that is attached to the wrist end and that can grip the measurement object.

According to another aspect, the present invention provides a thickness measurement method including: a first step of disposing a distance measurement instrument that can measure the distances to objects in two opposite directions, between an installation surface on which a measurement object is installed and a facing surface that is disposed parallel to the installation surface with a gap therebetween, such that the measurement directions thereof are aligned with the direction along the gap; a second step of measuring, with the distance measurement instrument, the distances in the two directions in a state in which the measurement object is not installed on the installation surface; a third step of measuring, with the distance measurement instrument, the distances in the two directions in a state in which the measurement object is installed on the installation surface; and a fourth step of calculating the difference between the total of the distances measured in the second step and the total of the distances measured in the third step.

DESCRIPTION OF EMBODIMENTS

A thickness measurement device 1 according to one embodiment of the present invention will be described below with reference to the drawings.

Figure 1:
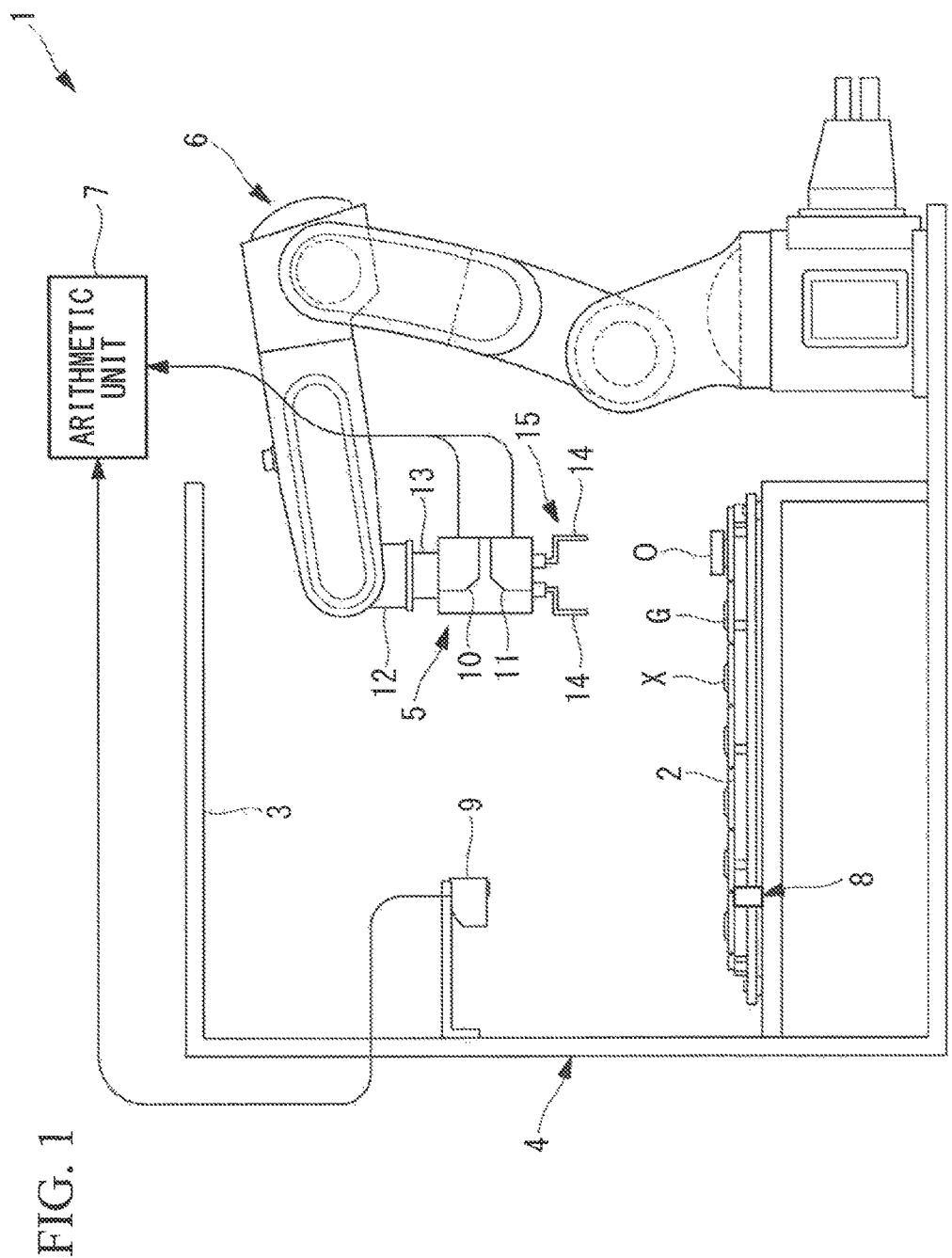
FIG. 1 is an overall view showing the configuration of a thickness measurement device according to one embodiment of the present invention.
Figure 2:
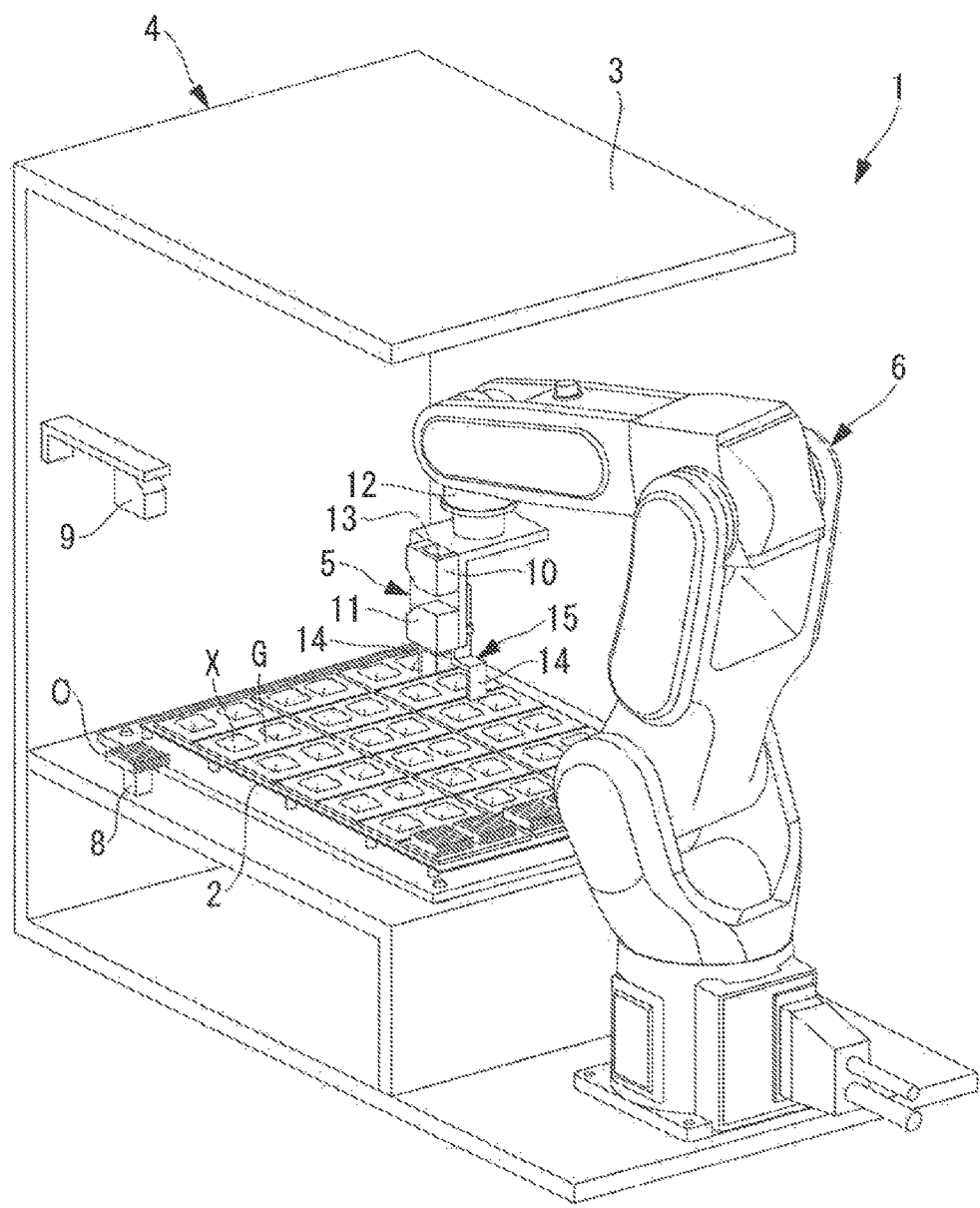
FIG. 2 is a perspective view showing the thickness measurement device shown in FIG. 1.

As shown in FIGS. 1 and 2, the thickness measurement device 1 of this embodiment is a device for measuring a thickness dimension of an adhesive agent X when a fin (measurement object) O is bonded to a printed circuit board G and is provided with: a chassis 4 that has a substantially horizontal mounting surface 2 on which the printed circuit board G is mounted and a ceiling surface (facing surface) 3 that is disposed above the mounting surface 2 so as to be substantially parallel to the mounting surface 2 with a gap therebetween; a distance measurement instrument 5 that is inserted between the mounting surface 2 and the ceiling surface 3 of the chassis 4 and that can measure the distances to objects that are located vertically therebelow and vertically thereabove; an articulated robot (movement mechanism) 6 that can position the distance measurement instrument 5 at a desired position in the chassis 4; and an arithmetic unit 7 that calculates the thickness dimension of the adhesive agent X on the basis of a measurement result of the distance measurement instrument 5.

This embodiment aims at measuring the thickness dimension of the adhesive agent X between the printed circuit board G and the fin O; thus, a bonding surface, for the fin O, of the printed circuit board G mounted on the mounting surface 2 serves as an installation surface on which the fin O is installed.

Figure 3A:
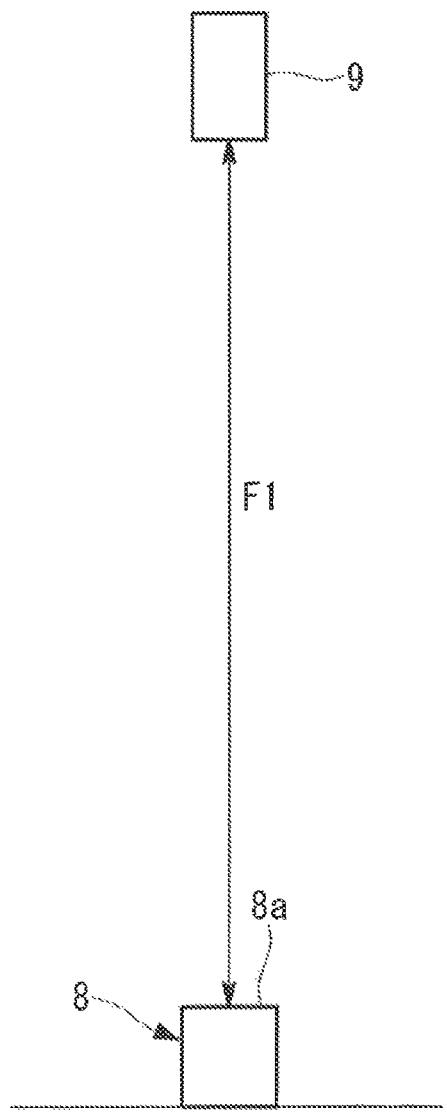
FIG. 3A is a view showing the distance from a sensor that is provided in a chassis of the thickness measurement device shown in FIG. 1 to a mounting surface of a temporary mounting table.
Figure 3B:
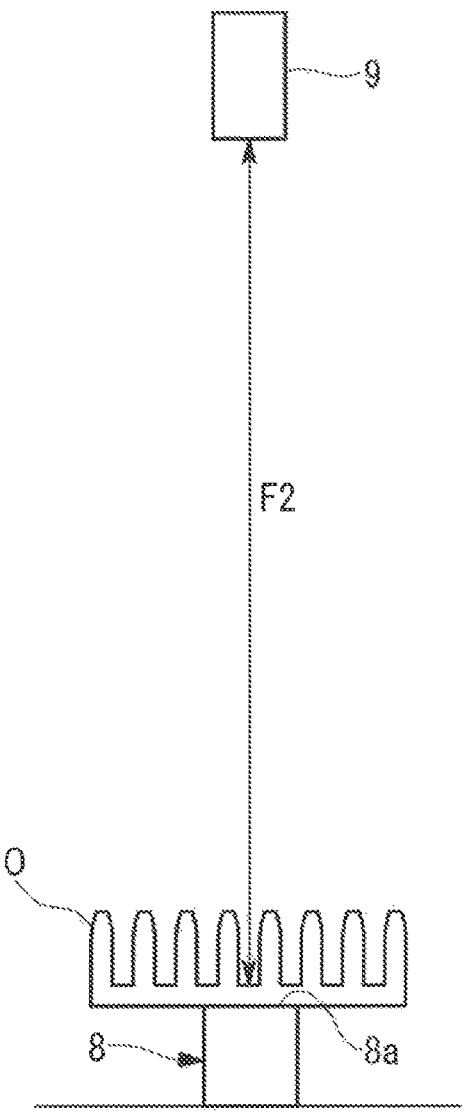
FIG. 3B is a view showing the distance from the sensor, which is provided in the chassis of the thickness measurement device shown in FIG. 1, to a trough of a fin mounted on the mounting surface of the temporary mounting table.

A temporary mounting table 8 on which the fin O is temporarily mounted in an installation orientation and an optical sensor 9 that is disposed vertically above the temporary mounting table 8 and that measures the distance to a mounting surface 8a of the temporary mounting table 8 or the distance to a trough of the fin O mounted on the mounting surface 8a of the temporary mounting table 8 are fixed to the chassis 4. The sensor 9 measures a distance F1 from the sensor 9 to the mounting surface 8a when the fin O is not mounted on the temporary mounting table 8, as shown in FIG. 3A, and measures a distance F2 from the sensor 9 to a trough of the fin O when the fin O is mounted on the temporary mounting table 8, as shown in FIG. 3B. The measurement result obtained by the sensor 9 is transmitted to the arithmetic unit 7.

Figure 4:
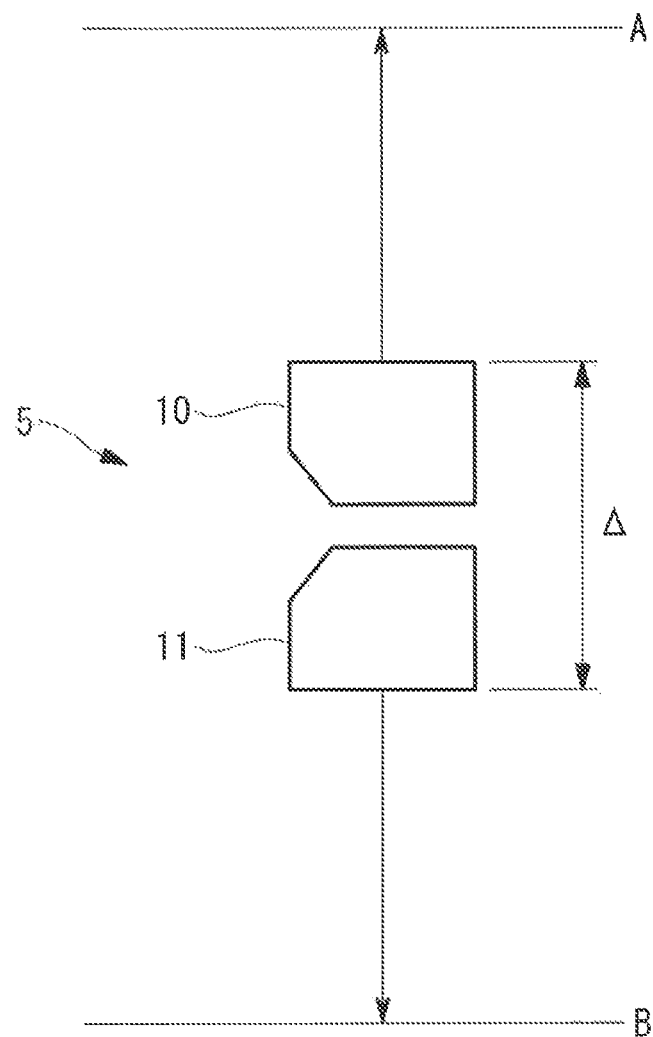
FIG. 4 is a view showing the configuration of two sensors of a distance measurement instrument in the thickness measurement device shown in FIG. 1.

The distance measurement instrument 5 is provided with two sensors 10 and 11 that have opposite measurement directions. As shown in FIG. 4, the sensors 10 and 11 are optical sensors that can measure the distances from their predetermined reference positions (for example, exit surfaces of the sensors 10 and 11 in the example shown in FIG. 4) to objects A and B existing in the measurement directions of the sensors 10 and 11. Although the reference positions of the two sensors 10 and 11 are located with a predetermined gap A therebetween, the dimension of the gap A may be unknown.

Specifically, the distance measurement instrument 5 is inserted between the mounting surface 2 and the ceiling surface 3 and is set in an orientation for aligning the measurement directions of the sensors 10 and 11 with the vertically upward and vertically downward directions, as shown in FIGS. 1 and 2; thus, the one sensor 11 measures the distance from the reference position thereof to the mounting surface 2, and the other sensor 10 measures the distance from the reference position thereof to the ceiling surface 3. Therefore, the total of the distances in the two directions measured by the two sensors 10 and 11 is constant irrespective of the vertical position unless the distance measurement instrument 5 is moved in the horizontal direction.

A bracket 13 is fixed to a wrist end 12 of the articulated robot 6, the distance measurement instrument 5 is fixed to the bracket 13, and a hand 15 that has fingers 14 capable of opening and closing so as to grip the fin O is attached thereto.

The arithmetic unit 7 calculates the total (R1+R2) of a distance R1 from the one sensor 11 to the printed circuit board G and a distance R2 from the other sensor 10 to the ceiling surface 3, which are measured by the distance measurement instrument 5 disposed between the mounting surface 2 and the ceiling surface 3 of the chassis 4, so as to measure a predetermined measurement point, in a state in which the printed circuit board G is mounted on the mounting surface 2 and in which the fin O is not mounted on the printed circuit board G, calculates the total (R3+R4) of a distance R3 from the one sensor 11 to the fin O and a distance R4 from the other sensor 10 to the ceiling surface 3, which are measured in a state in which the adhesive agent X is applied to the printed circuit board G and in which the fin O is mounted thereon, and calculates a difference P1 therebetween, i.e., (R1+R2)−(R3+R4).

Furthermore, upon receiving the distances F1 and F2 from the sensor 9, which is fixed to the chassis 4, the arithmetic unit 7 calculates a difference P2 therebetween, i.e., F1−F2, thereby calculating the thickness dimension of the fin O.

Then, the arithmetic unit 7 subtracts the calculated difference P2 from the calculated difference P1, thereby calculating the thickness dimension of the adhesive agent X intervening between the fin O and the printed circuit board G.

The thickness measurement method using the thus-configured thickness measurement device 1 of this embodiment will be described below.

Figure 5:
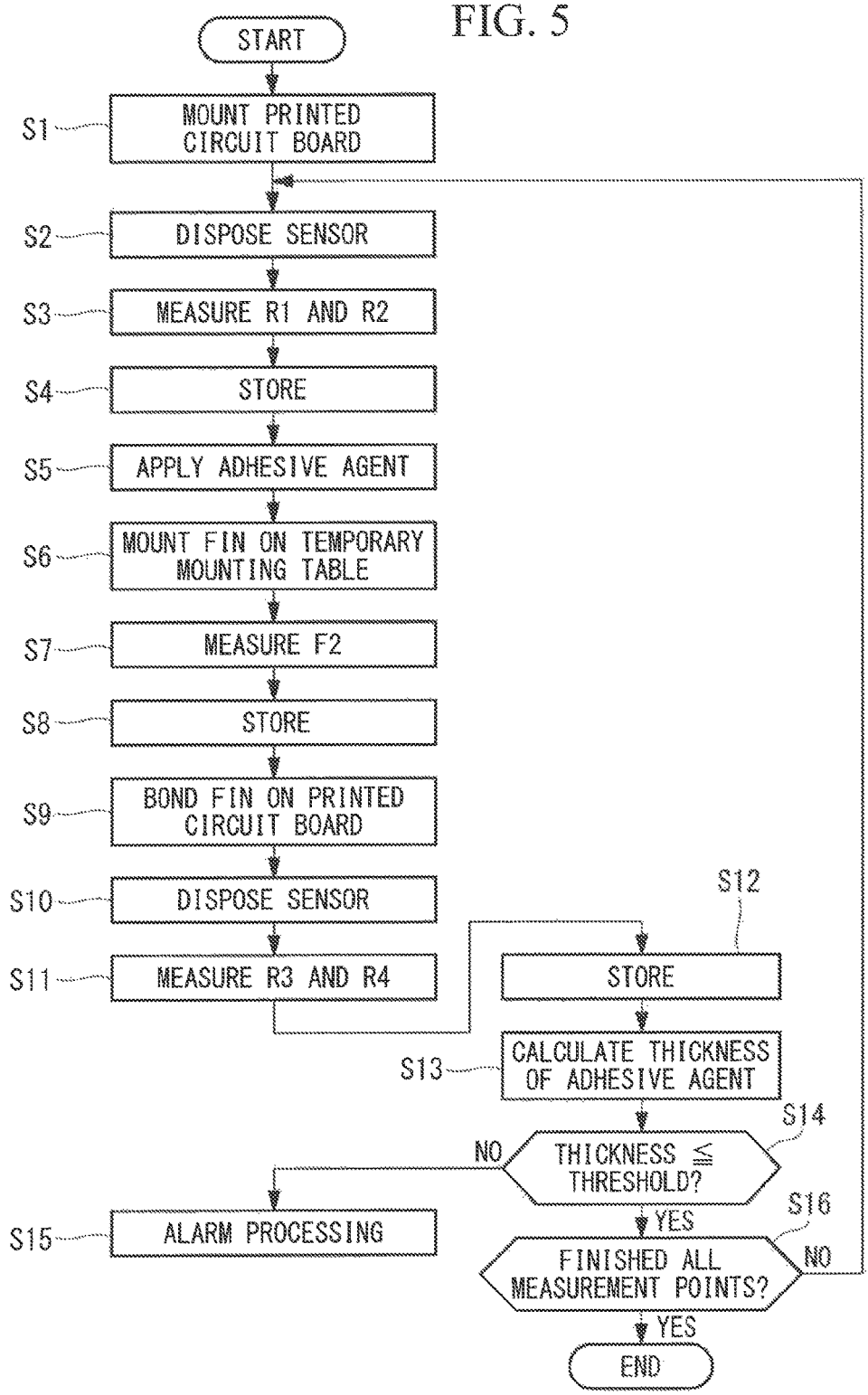
FIG. 5 is a flowchart showing a thickness measurement method using the thickness measurement device shown in FIG. 1.

As shown in FIG. 5, in the thickness measurement method of this embodiment, the printed circuit board G is mounted on the mounting surface 2 of the chassis 4 (Step S1), and the articulated robot 6 is actuated to set the distance measurement instrument 5 in an orientation for aligning the measurement directions of the sensors 10 and 11 with the upward and downward directions and to dispose the distance measurement instrument 5 at a position vertically above a measurement point between the printed circuit board G and the ceiling surface 3 (First Step S2). Then, the sensors 10 and 11 of the distance measurement instrument 5 are actuated to measure the distances R1 and R2 (Second Step S3) and store them in a storage unit (not shown) (Step S4).

In this state, the adhesive agent X is applied to a region of the printed circuit board G that includes the measurement point (Step S5).

Then, the articulated robot 6 is actuated to grip one fin O with the hand 15 and to temporarily mount the fin O on the temporary mounting table 8 (Step S6). The sensor 9, which is fixed to the chassis 4, obtains, in advance, the distance F1 from the sensor 9 to the upper surface (mounting surface) 8a of the temporary mounting table 8, stores it in the storage unit, measures the distance F2 from the sensor 9 to a trough of the fin O mounted on the temporary mounting table 8 (Step S7), and stores it in the storage unit (Step S8).

Next, the articulated robot 6 is actuated to grip the fin O mounted on the temporary mounting table 8 with the hand 15, and, through actuation of the articulated robot 6, the fin O is disposed at the region of the printed circuit board G, where the adhesive agent X has been applied, and is bonded thereto (Step S9).

In this state, the articulated robot 6 is actuated to again set the distance measurement instrument 5 in the orientation for aligning the measurement directions of the sensors 10 and 11 with the upward and downward directions and to dispose the distance measurement instrument 5 at a position vertically above the measurement point between the printed circuit board G and the ceiling surface 3 (First Step S10). Then, the sensors 10 and 11 of the distance measurement instrument 5 are actuated to measure the distances R3 and R4 (Third Step S11) and store them in the storage unit (Step S12).

Then, the arithmetic unit 7 calculates the differences P1 and P2 and then calculates the thickness dimension D of the adhesive agent X by using the following expression (Fourth Step S13).

$$D=P1-P2$$

It is determined whether the calculated thickness dimension is equal to or lower than a predetermined threshold (Step S14). If the calculated thickness dimension does not fall within the range, alarm processing is performed (Step S15). If the calculated thickness dimension falls within the range, it is determined whether measurement has been finished at all measurement points (Step S16). If measurement has not been finished, the measurement point is changed, and the process flow from Step S2 is repeated.

In this way, according to the thickness measurement device 1 of this embodiment and the thickness measurement method, the distance measurement instrument 5 is inserted between the mounting surface 2 and the ceiling surface 3, which are disposed in parallel with a gap therebetween, the distance measurement instrument 5 having the two sensors 10 and 11 measuring distances in the two opposite directions in the gap direction, and the thickness of the fin O is subtracted from the difference in the total distance at a measurement point between the state in which the fin O exists and the state in which the fin O does not exist, thereby making it possible to easily measure the thickness dimension of the adhesive agent X, which is difficult to be directly measured.

In this case, because the vertical position of the distance measurement instrument 5 does not affect the measurement precision of the thickness dimension of the adhesive agent X, even if the operating precision of the articulated robot 6 is low or even if the position of the distance measurement instrument 5 in the vertical direction is different between two measurements performed before and after handling of the fin O, there is an advantage that the thickness dimension can be measured with precision.

In this embodiment, although the present invention is applied to a case in which the thickness dimension of the adhesive agent X for bonding the fin O on the printed circuit board G is measured, the present invention is not limited thereto and can be applied to measurement of the thickness dimension of another desired measurement object.

Furthermore, although the measurement directions of the sensors 10 and 11 are set in the vertical directions, the measurement directions thereof may be set in the horizontal directions.

Although the articulated robot 6 is illustrated as the movement mechanism, the movement mechanism is not limited thereto, and another desired movement mechanism may be adopted.

As a result, the following aspect is read by the above described embodiment of the present invention.

According to one aspect, the present invention provides a thickness measurement device including: a chassis that is provided with an installation surface on which a measurement object is installed and a facing surface that is disposed substantially parallel to the installation surface with a gap therebetween; a distance measurement instrument that can measure the distances to objects in two opposite directions; a movement mechanism that disposes the distance measurement instrument at a measurement point between the installation surface and the facing surface such that the measurement directions thereof are aligned with the direction along the gap between the installation surface and the facing surface; and an arithmetic unit that calculates the difference between the total of distances in the two directions that are measured at the measurement point by the distance measurement instrument in a state in which the measurement object is not installed on the installation surface and the total of distances in the two directions that are measured by the distance measurement instrument in a state in which the measurement object is installed on the installation surface.

According to this aspect, through actuation of the movement mechanism, the distance measurement instrument is inserted between the installation surface and the facing surface of the chassis and is disposed at a measurement point such that the measurement directions of the distance measurement instrument are aligned with the direction along the gap between the installation surface and the facing surface, and the arithmetic unit calculates the difference in the total of the distances in the two directions that are measured by the distance measurement instrument between the state in which the measurement object is not installed on the installation surface and the state in which the measurement object is installed on the installation surface, thereby making it possible to measure the thickness dimension of the measurement object.

Specifically, because the distance measurement instrument measures the distances to objects in two opposite directions, the total of the distances does not change even when the distance measurement instrument is disposed at any position in the direction along the gap between the installation surface and the facing surface. Therefore, even when the distance measurement instrument is disposed at any position in the direction along the gap between the installation surface and the facing surface, in a state in which the measurement object is not installed, the total of distances measured by the distance measurement instrument serves as information indicating the distance between the installation surface and the facing surface, and, in a state in which the measurement object is installed, the total of distances measured by the distance measurement instrument serves as information indicating the distance between the measurement object and the facing surface. As a result, the difference between the two totals is calculated, thereby making it possible to calculate the thickness dimension of the measurement object with precision even when the operating precision of the movement mechanism is low.

In the above-described aspect, it is preferred that the measurement precision of the distance measurement instrument be higher than the operating precision of the movement mechanism.

According to this aspect, the operating precision of the movement mechanism does not affect the distance measurement precision, and the distance measurement precision depends on the measurement precision of the distance measurement instrument; therefore, as the measurement precision of the distance measurement instrument is increased, the thickness dimension of the measurement object can be calculated with precision.

In the above-described aspect, a plurality of the measurement objects may be installed on the installation surface.

By doing so, the distance measurement instrument is moved, through actuation of the movement mechanism, with respect to the plurality of measurement objects installed on the installation surface, thus making it possible to calculate the thickness dimensions of the respective measurement objects with precision.

In the above-described aspect, the measurement object may have a known thickness dimension and may be installed on the installation surface with an adhesive agent applied therebetween; and the arithmetic unit may subtract the thickness dimension of the measurement object from the calculated difference.

By doing so, it is possible to precisely measure the thickness dimension of the adhesive agent, which is difficult to be directly measured.

In the above-described aspect, the movement mechanism may be an articulated robot in which the distance measurement instrument is attached to a wrist end.

By doing so, through actuation of the articulated robot, the distance measurement instrument, which is attached to the wrist end, can be disposed at a desired position between the installation surface and the facing surface, thus making it possible to improve the degree of freedom of measurement.

In the above-described aspect, it is possible to further include a hand that is attached to the wrist end and that can grip the measurement object.

By doing so, it is possible to grip, with the hand, which is attached to the wrist end, the measurement object to install it on the installation surface and to calculate, with the distance measurement instrument, which is attached to the same wrist end, the thickness dimension of the measurement object. As a result, handling of the measurement object and distance measurement can be performed by the same articulated robot, thus making it possible to achieve a cost reduction.

According to another aspect, the present invention provides a thickness measurement method including: a first step of disposing a distance measurement instrument that can measure the distances to objects in two opposite directions, between an installation surface on which a measurement object is installed and a facing surface that is disposed parallel to the installation surface with a gap therebetween, such that the measurement directions thereof are aligned with the direction along the gap; a second step of measuring, with the distance measurement instrument, the distances in the two directions in a state in which the measurement object is not installed on the installation surface; a third step of measuring, with the distance measurement instrument, the distances in the two directions in a state in which the measurement object is installed on the installation surface; and a fourth step of calculating the difference between the total of the distances measured in the second step and the total of the distances measured in the third step.

By doing so, it is not necessary to separately provide a power source for identifying the hand.

The invention claimed is:

1. A thickness measurement device, comprising:
a chassis provided with an installation surface on which a measurement object is installed and a facing surface disposed substantially parallel to the installation surface with a gap therebetween;
a distance measurement instrument to measure distances to objects in two opposite directions;
a movement mechanism to position the distance measurement instrument at a measurement point between the installation surface and the facing surface such that the measurement directions thereof are aligned with the direction along the gap between the installation surface and the facing surface; and
an arithmetic unit to calculate the difference between the total of the distances in the two opposite directions that are measured at the measurement point by the distance measurement instrument in a state in which the measurement object is not installed on the installation surface and the total of the distances in the two opposite directions that are measured by the distance measurement instrument in a state in which the measurement object is installed on the installation surface.

2. A thickness measurement device according to claim 1, wherein a measurement precision of the distance measurement instrument is higher than an operating precision of the movement mechanism.

3. A thickness measurement device according to claim 1, wherein a plurality of the measurement objects are installable on the installation surface.

4. A thickness measurement device according to claim 1,
wherein the measurement object has a known thickness dimension and is installed on the installation surface with an adhesive agent applied therebetween; and
the arithmetic unit subtracts the thickness dimension of the measurement object from the calculated difference.

5. A thickness measurement device according to claim 1, wherein the movement mechanism is an articulated robot where the distance measurement instrument is attached to a wrist end.

6. A thickness measurement device according to claim 5, further comprising a hand attached to the wrist end trip the measurement object.

7. A thickness measurement method comprising:
disposing a distance measurement instrument to measure distances to objects in two opposite directions, between an installation surface on which a measurement object is installed and a facing surface that is disposed parallel to the installation surface with a gap therebetween, such that the two opposite directions are aligned with the gap;
measuring, with the distance measurement instrument, the first distances in the two opposite directions in a state in which the measurement object is not installed on the installation surface;
measuring, with the distance measurement instrument, the second distances in the two opposite directions in a state in which the measurement object is installed on the installation surface; and
calculating a difference between the first distances and the second distances.

* * * * *